(12) United States Patent
Ahn et al.

(10) Patent No.: US 6,536,222 B1
(45) Date of Patent: Mar. 25, 2003

(54) CEILING ASSEMBLY FOR THE DUCTED TYPE OF RVAC

(75) Inventors: Young-Kill Ahn, Kwangju (KR); Jcong-Un Lyu, Kwang Ju (KR); Jong-Ho Kim, Seoul (KR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/012,935

(22) Filed: Dec. 10, 2001

(51) Int. Cl.$^7$ ................................................ B60H 3/04
(52) U.S. Cl. ...................... 62/244; 62/DIG. 16; 454/234
(58) Field of Search ........................... 62/244, DIG. 16; 454/230, 233, 234

(56) References Cited

U.S. PATENT DOCUMENTS

| 4,403,481 A | * | 9/1983 | Yoho, Sr. ................ 62/DIG. 16 |
| 4,895,066 A | * | 1/1990 | Carnahan ................ 62/DIG. 16 |
| 4,920,764 A | * | 5/1990 | Martin .................... 62/DIG. 16 |
| 5,832,674 A | * | 11/1998 | Ledbetter et al. ....... 62/DIG. 16 |
| 6,339,934 B1 | * | 1/2002 | Yoon et al. ............ 62/DIG. 16 |

* cited by examiner

Primary Examiner—William E. Tapolcai
(74) Attorney, Agent, or Firm—Wall Marjama & Bilinski LLP

(57) ABSTRACT

An air conditioning unit having a return air inlet and a supply air outlet upon the roof of a vehicle that includes a mounting frame located within an opening in the roof of a vehicle with the frame extending into the comfort region of said vehicle, with said comfort region having a front and rear section. The air conditioning unit is supported upon the top of the frame so that the return air inlet and supply air outlet are in fluid flow communication with the interior of said frame, which is enclosed at the bottom by a floor panel. A partition extends across the width of the frame dividing the frame into a return air compartment that communicates with the return air inlet of the air conditioning unit and a supply air compartment that communicates with the supply air outlet of the air conditioning unit. Longitudinal supply ducts are mounted in the opposed end walls of said frame and are in direct fluid flow communication with the frame supply air compartment. The air supply compartment further includes means for evenly distributing conditioned air to both the front and rear sections of the comfort region of the vehicle.

5 Claims, 4 Drawing Sheets

CEILING ASSEMBLY FOR THE DUCTED TYPE OF RVAC

FIELD OF THE INVENTION

This invention relates generally to air conditioning, and in particular to improved duct paths for an air conditioning unit designed for placement and use upon the roof of a vehicle such as a recreational vehicle (R.V.).

BACKGROUND OF THE INVENTION

Typically, a rooftop air conditioning unit is seated upon a mounting frame that passes downwardly through an opening in the roof into the passenger compartment or comfort zone. The frame typically is divided into two sections, one of which conducts return air from the interior of the vehicle into the air conditioner and the other of which conducts supply air from the air conditioner back to the interior of the vehicle.

Generally, the ceiling assembly of a ducted type recreational vehicle air conditioner is designed for the transverse discharging air, namely, the paths of the air flow are toward both sides, left and right. This design causes bending of the duct paths which significantly reduces the system performance; and as a consequence, the efficiency of the air conditioning unit is adversely effected.

SUMMARY OF THE INVENTION

It is therefore an object of the present invention to improve air conditioning units in particular, and more specifically air conditioning units that are mounted upon the roofs of vehicles such as recreational vehicles.

A further object of the present invention is to provide improved ducting for an air conditioning unit which is mounted upon the roof of a motor vehicle.

A still further object of the present invention is to provide the apparatus which distributes conditioned air more evenly to the front and rear of a vehicle from an air conditioning unit upon the roof of the vehicle.

Yet another object of the present invention is to provide a one piece, low cost duct assembly for efficiently separating the supply air and return air flow path in the mounting frame of an automotive roof top air conditioning unit.

These and other objects of the present invention are attained by the novel ducting and associated apparatus for an air conditioning unit upon the roof of a vehicle. The apparatus includes a mounting frame that passes downward through the roof of a vehicle upon which the air conditioning unit is seated. A floor panel is mounted in the frame and a partition divides the interior of the frame into two compartments and the base of the partition is secured to the floor panel. Each compartment communicates with the interior of the vehicle so that return air is drawn upwardly into the air conditioning unit through one compartment and supply air is passed downwardly through the second compartment.

A pair of longitudinal supply air ducts are mounted in the opposed end side walls of the frame and form a duct assembly which is in fluid flow communication with the frame supply air compartment. Accordingly, comfort air discharged through a supply air opening in the pan passes through the frame and is distributed into ducts. The duct assembly further contains an "air guide", to distribute the conditioned air more evenly in both sides of the vehicle, front and rear. Without the "air guide", the difference of air flow rate between the front and the rear of the vehicle rises dramatically. In one embodiment, the air guide is in the form of a plate or baffle which is designed to deflect and guide the conditional air for even distribution.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 3:
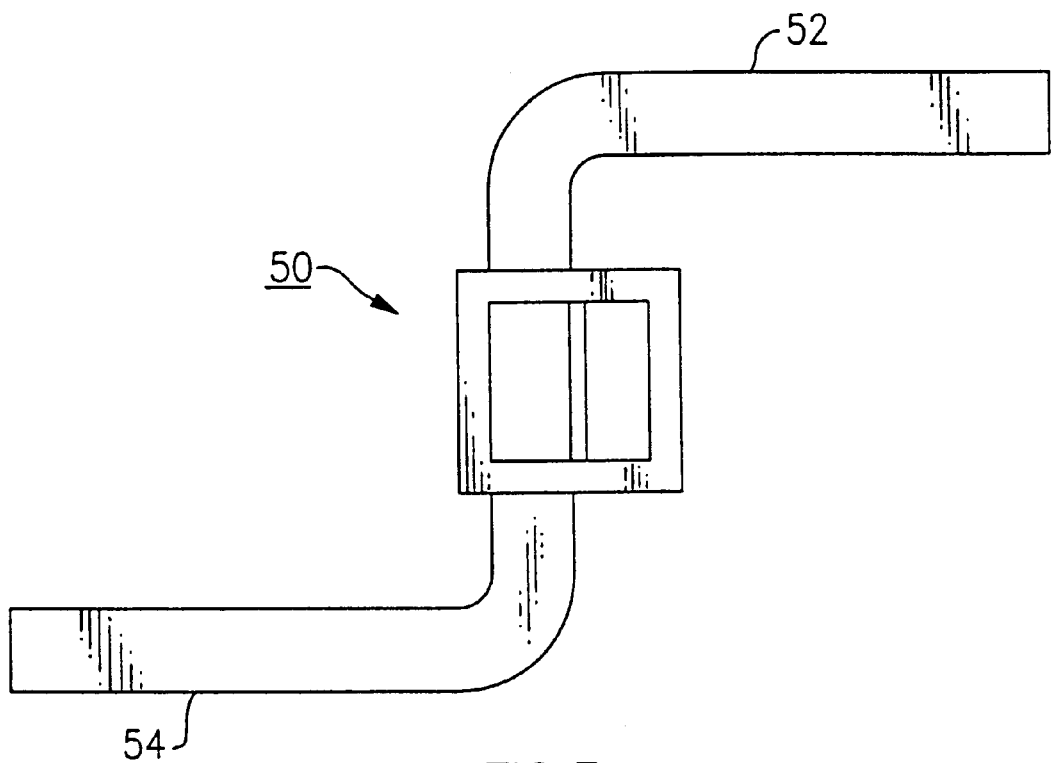
FIG. 3 is schematic illustration of a conventional prior art ducting system for a roof top air conditioning unit.
Figure 4:
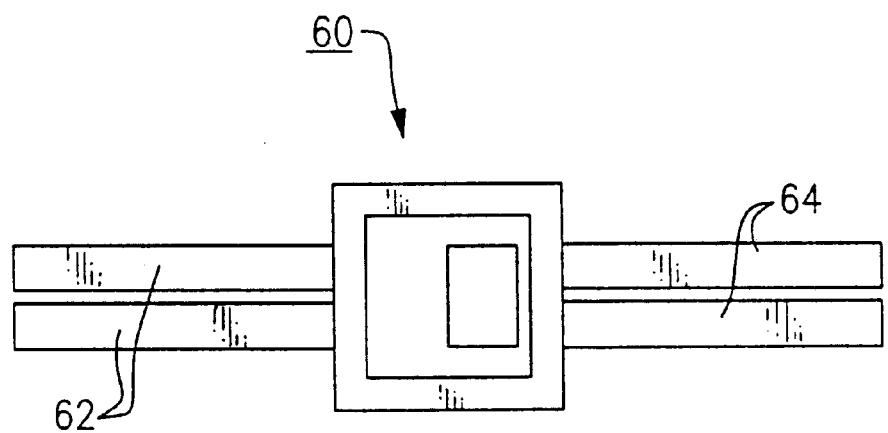
FIG. 4 is a schematic illustration of the ducting system of the present invention.

As previously discussed above, the ceiling assembly 50 of conventional prior art ducted type recreational vehicle air conditioner are designed for the transverse discharging air. As illustrated schematically in FIG. 3 of the drawings, the paths of the air flow are toward both sides, left and right. This causes bending of the duct paths 52 and 54 which reduces system performance and results in increased manufacturing and assembly costs. As illustrated in FIG. 4, the present invention enables the ceiling assembly 60 to have high performance by eliminating the need of bending duct paths, and utilizing longitudinal duct paths 62 and 64, front and rear. This provides for a more simplified design in which the air flow is transported directly to the comfort zone resulting in improved system performance.

Figure 1:
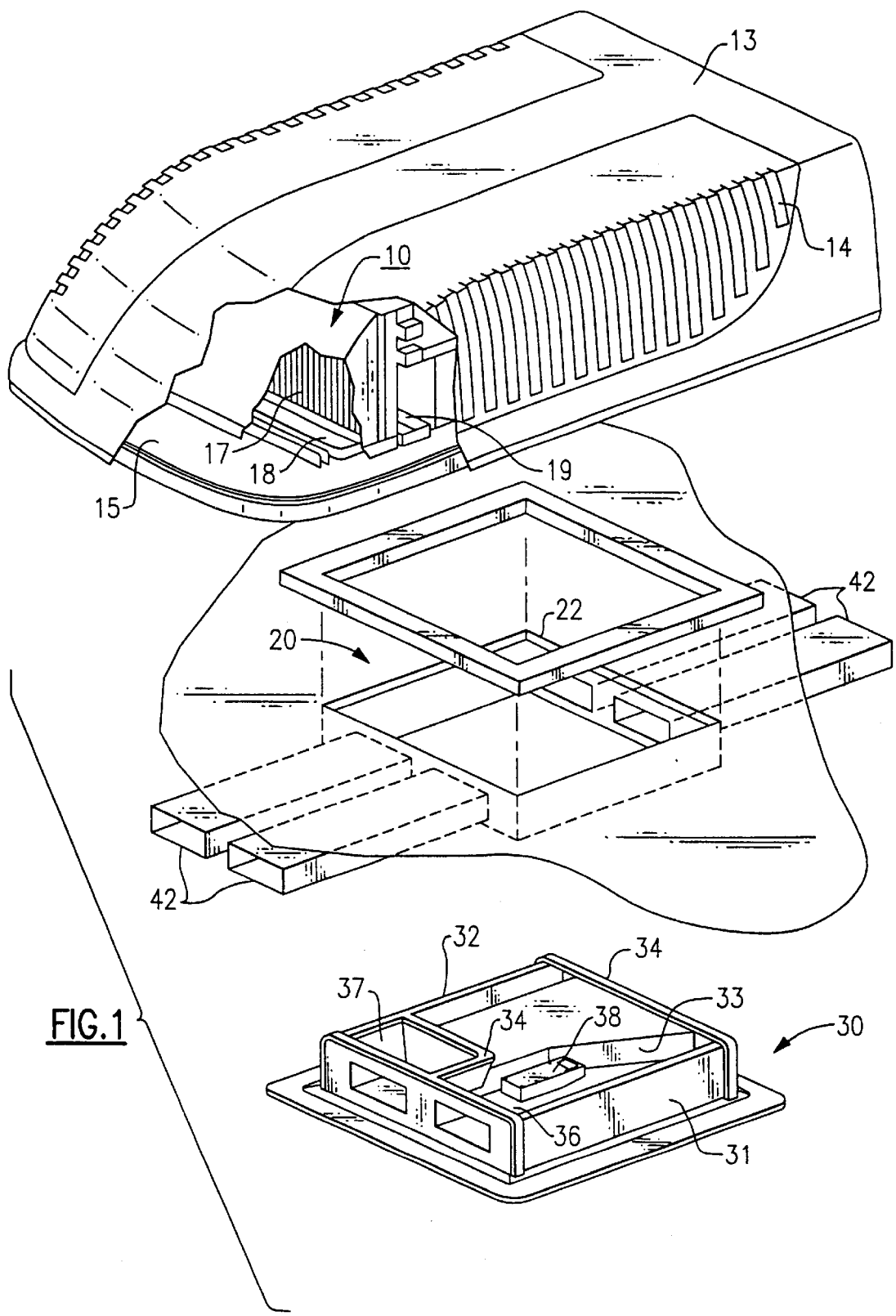
FIG. 1 is an exploded view in perspective of a rooftop air conditioning unit showing the ducting assembly embodying the teachings of the present invention.

Referring to FIG. 1, there is illustrated an air conditioning unit, generally referenced 10, that has a low profile and is ideally suited for mounting upon the roof of a motor vehicle such as a recreational vehicle or the like. The air conditioning unit is enclosed within a cabinet 13 that is adapted to seat tightly on the pan 15 of the unit. Bent openings 14 are formed in the cabinet to permit ambient air to move freely into and out of the cabinet. The air conditioning unit is secured to the pan and contains a vertically disposed evaporator coil 17. A return air opening 18 is formed in the pan on one side of the evaporator coil and a supply air opening 19 is similarly provided in the pan on the opposite side of the evaporator coil. Although not shown, a blower fan is arranged to draw return air upwardly into the unit and distribute the air evenly over the heat exchanger surfaces of the coil to condition the air. The conditioned air is then directed downwardly through the supply air openings 19 back into the comfort region which, in this case, is the interior of the vehicle.

Figure 2:
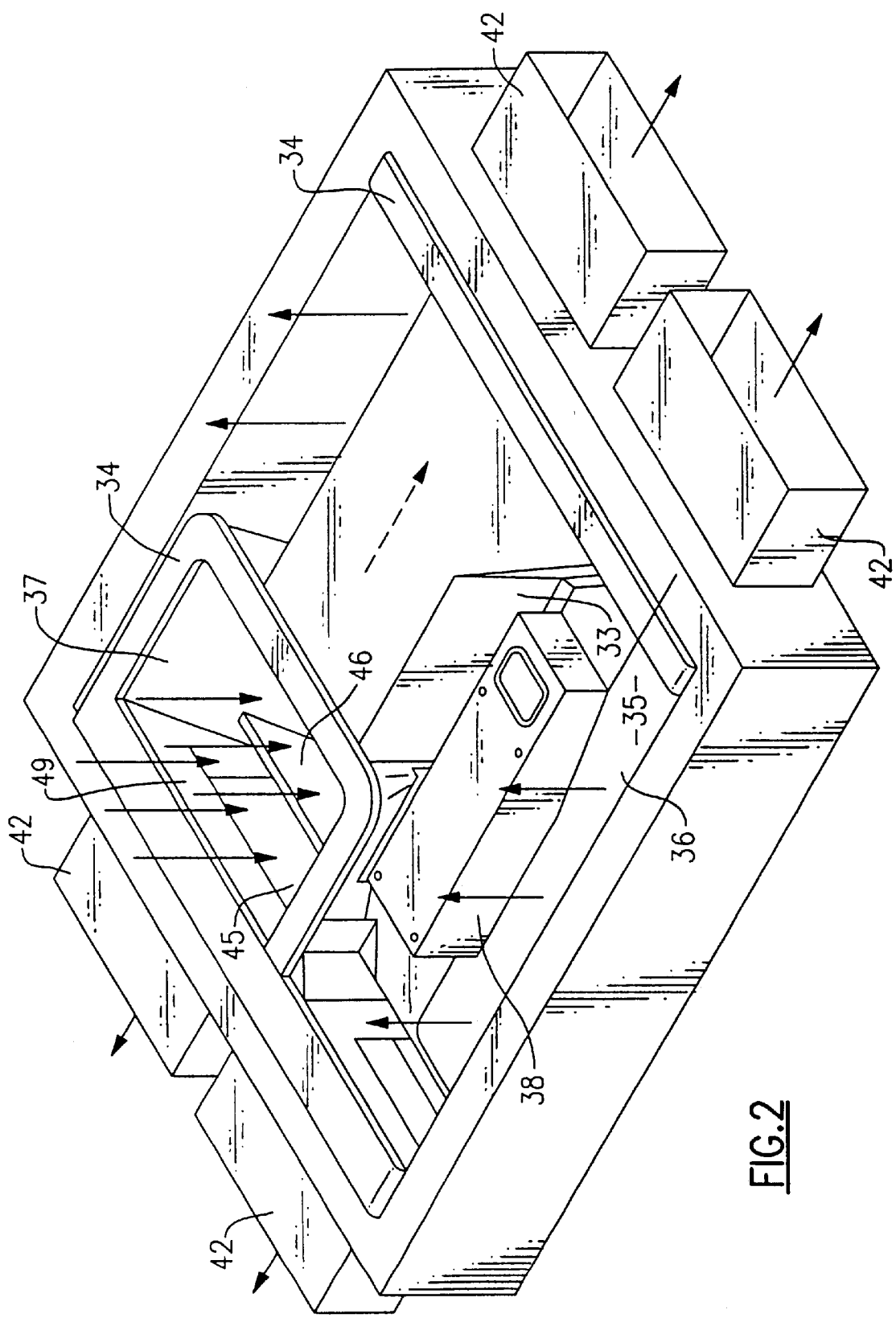
FIG. 2 is an enlarged perspective view showing the mounting frame and duct assembly for the roof top air conditioning unit illustrated in FIG. 1.

With further reference to FIGS. 1 and 2 there is shown a mounting frame, generally referenced 20, that is arranged to be received within an opening 22 formed in the roof and ceiling of the vehicle. Although not shown, fasteners of any well known construction are provided for securing the frame within the roof opening. The pan of the air conditioning unit is similarly fastened to a roof bracket that is mounted on the top edge of the frame (FIG. 1).

The mounting frame 20 is generally rectangular in form and has a height that permits the frame to pass downwardly beneath the ceiling of the vehicle into the comfort region. A floor panel assembly 30 designed to fit within opening 22 and is secured to the bottom of the frame. The assembly consists of a molded one-piece part formed of high strength plastic and metal frame panel part. More specifically, the panel includes a raised deck 31 that passes upwardly into the frame in assembly, and a peripheral rim 32 that closes against the bottom edge of the frame. The floor panel assembly is secured to the pan 15 by threaded fasteners or the like (not shown) that are adapted to pass through holes provided in the rim. A floor opening is provided in the raised deck of the panel and, as will be explained in greater detail below, through which return air is drawn into the air conditioning unit.

A partition 33 divides the interior of the assembled frame into two separate compartments which are a first return air compartment 36 and a second supply air compartment 37. Flexible foam seal members 34 are positioned at the top edge surfaces and function to separate and seal compartments 36 and 37. The return air compartment is in fluid flow communication with the return air opening 18 in the pan so that the air conditioning unit blower is able to draw return air upwardly through the floor opening 35 in the frame floor panel 30. A filter assembly (not shown) is mounted over the floor panel assembly of the frame for removing unwanted contaminants from the return air flow passing into the frame. An electrical control box 38 is stored in the return air compartment of the frame that has a terminal (not shown) for connecting the box to various components of the air conditioning unit. Mounting the box within the frame results in a considerable saving of space while not appreciably impeding the flow of return air to a point where it might adversely effect the performance of the roof top unit.

Figure 5:
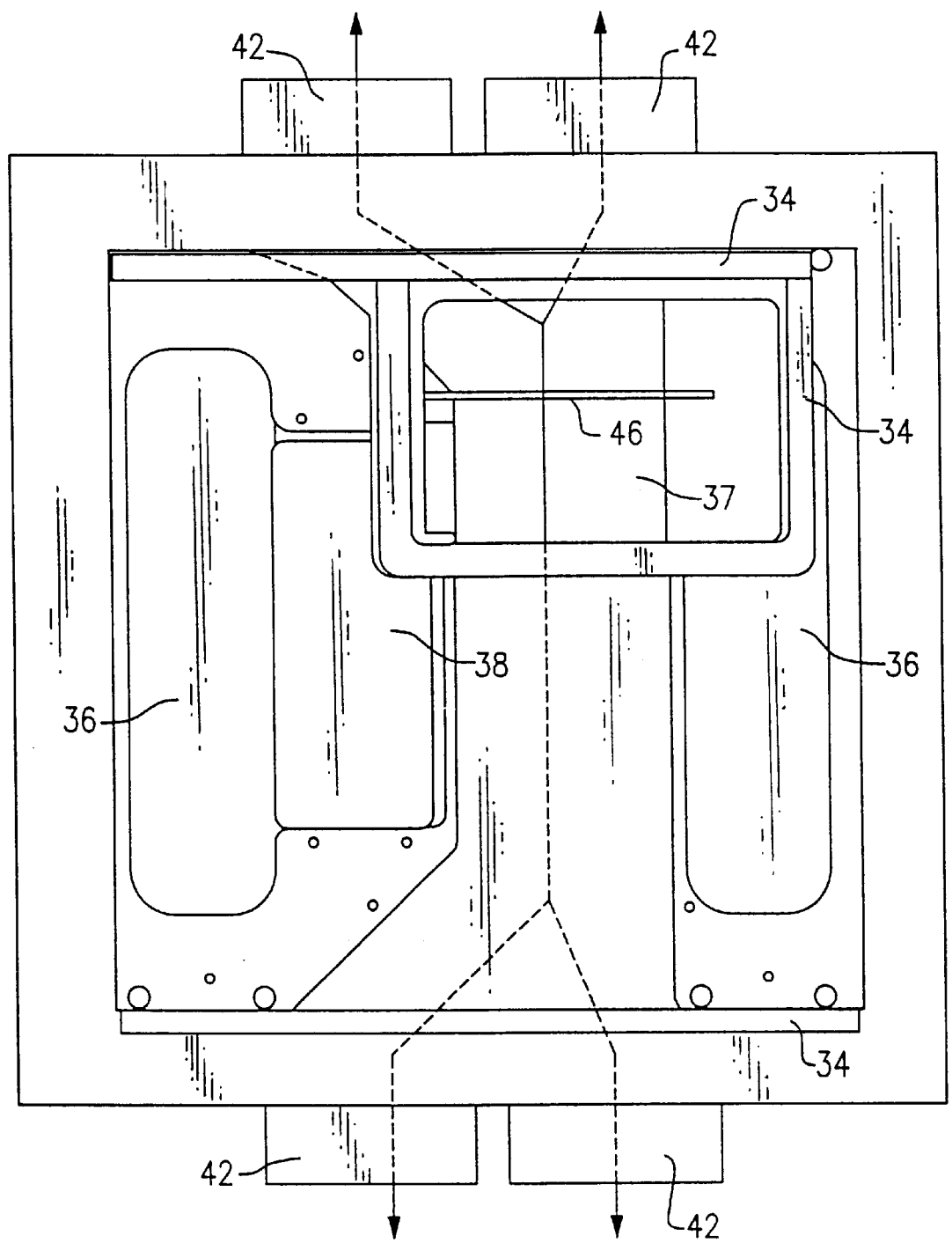
FIG. 5 is a plan view of the mounting frame and duct assembly of FIG. 2 showing in dotted lines the air flow path through ducts 42.

According to the present invention, as illustrated in FIG. 2, a pair of longitudinal supply ducts 42 are mounted in the opposed end side walls of the frame which are in fluid flow communication with the frame supply air compartment. As illustrated by the arrows in FIG. 2, comfort air discharged through the supply air opening 19 in the pan passes through the frame and is distributed into ducts 42. FIG. 5 is a plan view which is more clearly illustrates by the dotted lines and arrows the air flow through ducts 42. The duct assembly further contains an internal air guide 46 in the form of a vertical barrier or plate which directs the conditioned air to more evenly distribute the air to the front and rear of the vehicle comfort zone. As shown in FIG. 2, the air guide functions to deflect the conditioned air evenly to the front and rear sections of the comfort zone, with the arrows indicating the path of air flow. A gap or space 45 between the air guide 46 and the end wall 49 functions to distribute the discharged air to front and rear ducts evenly. The gap width in the embodiment illustrated in FIG. 2 is 53 mm wide, and depends on the position of the air discharge opening, and is varied accordingly.

Table 1 below illustrates the mean velocity with respect to the effect of the air guide. Without "air guide", the difference of air flow rate between the front and the rear arise dramatically. With "air guide", however, the air flow rate is almost even in both sides.

TABLE 1

The test result of the mean velocity with respect to "air guide"

| Condition | *Front Left Duct | Front Right Duct | Rear Left Duct | Rear Right Duct |
|---|---|---|---|---|
| Without "air guide" | 4.6 | 7.1 | 10.0 | 5.3 |
| With "air guide" | 6 | 7 | 6.9 | 4.7 |

*units:m/s

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An air conditioning unit having a return air inlet and a supply air outlet upon the roof of a vehicle that includes
   a mounting frame located within an opening in the roof of a vehicle whereby the frame extends into the comfort region of said vehicle, with said comfort region having a front and rear section,
   means for supporting an air conditioning unit upon the top of said frame so that the return air inlet and supply air outlet are in fluid flow communication with the interior of said frame,
   a floor panel enclosing said bottom of said frame,
   a partition extending across the width of said frame for dividing the frame into a return air compartment that communicates with the return air inlet of said air conditioning unit and a supply air compartment that communicates with the supply air outlet of said air conditioning unit, and
   longitudinal supply ducts mounted in the opposed end walls of said frame which are in fluid flow communication with the frame supply air compartment.

2. The unit of claim 1 wherein said supply ducts are disposed in a direct longitudinal path to the front and rear sections of said comfort zone.

3. The unit of claim 1 that further includes means in said air supply compartment for evenly distributing conditioned air through said ducts to both said front and rear sections of said comfort region.

4. A air conditioning unit having a return air inlet and a supply air outlet upon the roof of a vehicle that includes
   a mounting frame located within an opening in the roof of a vehicle whereby the frame extends into the comfort region of said vehicle, with said comfort region having a front and rear section,
   means for supporting an air conditioning unit upon the top of said frame so that the return air inlet and supply air outlet are in fluid flow communication with the interior of said frame,
   a floor panel enclosing said bottom of said frame,
   a partition extending across the width of said frame for dividing the frame into a return air compartment that communicates with the return air inlet of said air conditioning unit and a supply air compartment that communicates with the supply air outlet of said air conditioning unit,
   a pair of longitudinal supply ducts mounted in the opposed end walls of said frame which are in fluid flow communication with the frame supply air compartment and function to supply air in a direct longitudinal path to said front and rear sections of said comfort zone, and
   means in said air supply compartment for evenly distributing conditioned air through said ducts to both said front and rear sections of said comfort region.

5. The unit of claim 4 in which the distributing means comprises an air guide member in the form of a plate or baffle.

* * * * *